United States Patent
Wegener

(10) Patent No.: US 6,898,557 B2
(45) Date of Patent: *May 24, 2005

(54) SYSTEM AND METHOD FOR REMOTE TESTING OF COMPONENTS

(75) Inventor: Rudolf Wegener, Le Versoud (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

This patent is subject to a terminal disclaimer.

(21) Appl. No.: 10/147,038

(22) Filed: May 17, 2002

(65) Prior Publication Data

US 2003/0216891 A1 Nov. 20, 2003

(51) Int. Cl.[7] .............................................. G06F 15/00
(52) U.S. Cl. ........................ 702/188; 702/57; 702/68; 702/104; 702/188; 379/22.01; 379/124; 340/505; 340/870.02; 700/9; 700/17; 700/83; 324/76.11
(58) Field of Search ............................. 702/57–59, 64, 702/68, 85, 104, 116, 182–185, 188, 122, 189, FOR 103, 135, 155, 156, 171; 379/22.01, 24, 29.01, 1.01, FOR 137, FOR 143; 340/505, 635, 3.1, 825.29, 870; 700/9, 17, 83; 324/76.11

(56) References Cited

U.S. PATENT DOCUMENTS

| | | | | | |
|---|---|---|---|---|---|
| 4,570,217 | A | * | 2/1986 | Allen et al. ................... | 700/83 |
| 5,504,801 | A | * | 4/1996 | Moser et al. ................. | 379/29 |
| 5,511,108 | A | | 4/1996 | Severt et al. ................. | 379/21 |
| 5,528,661 | A | * | 6/1996 | Siu et al. ..................... | 379/27 |
| 5,615,225 | A | * | 3/1997 | Foster et al. ................. | 379/29 |
| 6,033,226 | A | | 3/2000 | Bullen ........................ | 434/219 |
| 6,055,487 | A | | 4/2000 | Margery et al. ............. | 702/84 |
| 6,085,244 | A | | 7/2000 | Wookey ..................... | 709/224 |
| 6,104,988 | A | | 8/2000 | Klarer ........................ | 702/183 |
| 6,288,753 | B1 | | 9/2001 | DeNicola et al. ........... | 348/586 |
| 6,297,845 | B1 | * | 10/2001 | Kuhn et al. ................. | 348/192 |
| 2002/0133749 | A1 | * | 9/2002 | Peterson et al. ............. | 714/27 |
| 2003/0040873 | A1 | * | 2/2003 | Lesesky et al. ............. | 702/57 |

OTHER PUBLICATIONS

Gustavsson, 'Remote Laboratory Experiments in Electrical Engineering Education', Apr. 2002, pp. 1025–1 to 1025–5.*
Scully, 'Networked Diagnostic Communications in Avionics Support', Sep. 2000, IEEE Article, pp. 505–512.*
Chong et al., "Audio–Visual Guided Predictive Simulator in Multi–telerobot Coordination", Jan. 2000, IEEE Pub, p. 614–619.*

* cited by examiner

Primary Examiner—Marc S. Hoff
Assistant Examiner—Elias Desta

(57) ABSTRACT

A system and method are disclosed for remote testing of items where the tests are performed at a first site and monitored and controlled at a second site. A first remote test control station at the first site includes a test bench device for testing the items, and a video meeting station for viewing and controlling the test bench device. The second site includes a remote test control station, where the second remote test control station can control the testing parameters of the test equipment used by the test bench device, in near real time. The second remote test control station at the second site and the video meeting station at the first site are connected via both voice/audio links and visual links.

24 Claims, 8 Drawing Sheets

SYSTEM AND METHOD FOR REMOTE TESTING OF COMPONENTS

BACKGROUND

As new hardware devices are designed and developed, there is a need to test the individual components to ensure that they meet the requirement specifications. Present systems use a variety of suppliers for required components. Qualification testing is typically performed by the supplier of the individual components, and repeated or verified by the hardware manufacturer.

The manufacturer/designer/production team of the electronic device will define system requirements for both the entire device and for each individual component. The component requirements are forwarded to the supplier of that component for input into their testing requirements. Once the component has been built by the supplier, a predetermined number of the built components are tested to ensure that they meet the designer's requirements. Typically, the supplier will perform its own set of tests and subjectively determine whether or not the component has passed. These test results are then forwarded, with the components tested, back to the quality assurance team. It is then typically necessary for the quality assurance team to retest the components and compare their results with the supplier's test results. Frequently, the quality assurance team will find a difference in results. These differences are caused most often by virtue of the fact that the two test teams use different setups, different handling of the measurement equipment, or have differently-trained test teams. For instance, suppliers in some localities often have high turnover of staff which requires the new test staff to be properly trained before completing the tests.

When the results obtained by the quality assurance test staff are significantly different than the supplier test staff, the electronic component must then often be retested at the supplier site, after a possible reconfiguration, to conform to the test requirements of the production team. If there are anomalies, or if the electronic component does not meet the standards of the requirement specification, then the design or implementation of the electronic components must be fixed at the supplier site. This resulting retesting of electronic device components, as well as the communications back and forth between the production and quality assurance teams and the supplier, introduce unacceptable delays in the manufacturing process. The "time-to-market" for these devices is typically three to six months from conception through mass manufacture. If many of these delays are introduced, the components will be close to obsolete by the time they are introduced into market. Therefore, there is a need to shorten this cycle of design test and market.

SUMMARY

An embodiment of the present system and method is a system for remote testing of electrical and other components wherein the tests are performed both at a supplier site and monitored and controlled at the production team site. Typical production teams utilize a separate quality assurance team for this type of testing and test analysis. Thus, the term "quality assurance team" will be used herein to indicate any test team organization controlled by the production or manufacturing team. A test control station at the supplier site includes a test bench device for actually testing the electronic components, a video meeting station connected to the test bench device for viewing and controlling the test bench device. A remote test control station typically residing at the site of the quality assurance team is used, where the remote test control station can control the testing parameters of the test bench device at the supplier site. The test control station and the video meeting station at the supplier site are connected via both voice/audio links and visual links.

Typically, an inexpensive video camera, or Webcam, is connected at the video meeting station with the test bench device so that users at the remote station can view the actual electronic device component test visually, in near real time, via the Internet or other global distributed network. A more expensive, and higher resolution, Web-enabled camera can be used, if available. The visual test information is captured via the inexpensive video camera and sent to the remote test control station at the site of the quality assurance teams via the global computer network using software services, such as the WebEx interactive service, commercially available from WebEx Communications, Inc., headquartered in San Jose, Calif. Other interactive services may be used as they become available. WebEx services are used because they can traverse firewalls. Thus, the test bench device and the remote test control station may be fully secure networks and communicate with each other via the WebEx services through one or more firewalls.

The remote test control station will typically have a computer display with a number of areas of display, for instance, display windows. One window will show the video component of the test. For instance, if a power supply is being tested, the video display will show the output of the video camera at the test bench site where what is typically shown is the actual power supply with the locations of the probes, or other test devices, so that the actual test procedure may be viewed by the personnel at the remote test control station, in near real time. Another window on the display at the remote test control station will be a display of output from the actual test devices. For instance, in the case of a power supply component, an oscilloscope may be connected to the power supply and various readings will be taken based on where the probes are placed on the power supply during operation of the test. The output of the oscilloscope will appear on the display at the remote test control station, as well as on the oscilloscope monitor, if any.

This system will allow the personnel at the remote test control station to modify the parameters of the test. For instance, the oscilloscope will have a number of parameters that must be set in order to take the readings and test the power supply. The test personnel at the test bench location at the supplier site may have either incorrectly set these parameters, or have been trained improperly or inadequately and thus, the procedures are not in conformance with the requirements of the production team. Therefore, the quality assurance test team has the option of changing these parameters and controlling the test from the remote location. This effects a training session for the personnel at the supplier site so that the next time this test is performed, they will, in fact, be using a conforming test procedure.

DESCRIPTION OF THE DRAWINGS

The detailed description will refer to the following drawings, wherein like numerals refer to like elements, and wherein.

DETAILED DESCRIPTION

It will be understood by one of ordinary skill in the art that testing and monitoring of components may be conducted by any organization in the supply chain, including third party contractors or government agencies, and the terms "supplier" and "production teams" are used for illustrative purposes, herein, with no loss of generality.

Figure 1:
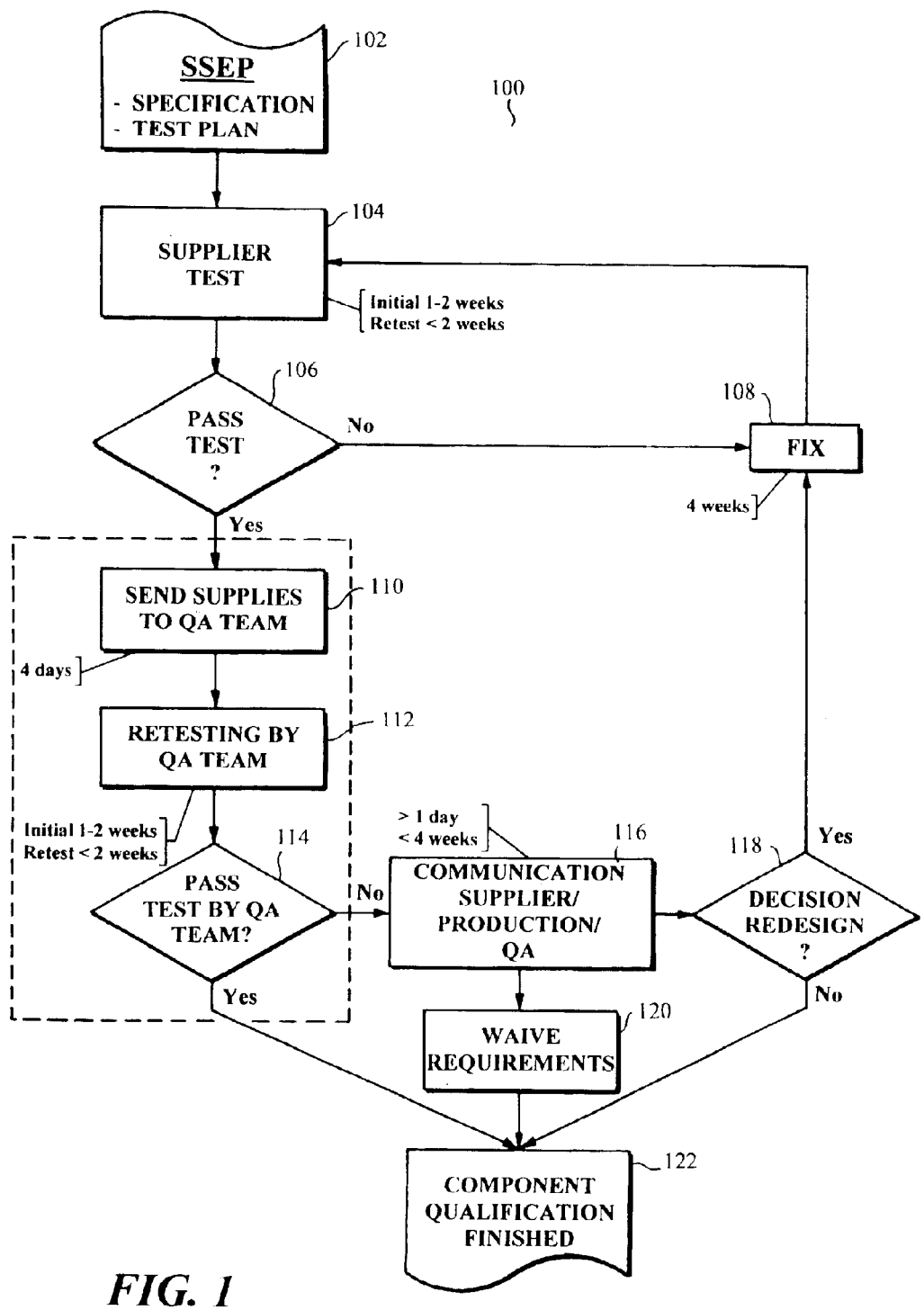
FIG. 1 shows a prior art method for testing of electronic components by a supplier and to be approved by a quality assurance team.

Referring now to the drawings, and specifically to FIG. 1, there is shown a method of testing electronic components as is performed currently in the prior art. Before a supplier can begin testing a component, a test plan must be developed from the requirement specification. In step 102 an SSEP (Supplier Self Evaluation Process) is developed to define the test parameters and procedures, based on requirements of the production team. Once a test plan has been developed, the supplier then proceeds with testing the electronic component in step 104. This initial testing typically takes from one to two weeks for a component such as a power supply. The length of time will depend on the specific requirements of the production team, as well as the complexity of the electronic component. A determination is made as to whether the components have passed the test in step 106. If they have not passed the test, then the components must be fixed or the requirements modified. In step 108 the fixes are performed and then the component is retested in step 104. The fixing of the anomalies in the component can take up to four weeks, for instance, for a power supply component. The retesting in step 104 might take approximately two weeks or less.

Once the component has passed the test, as defined in the test plan, then the components are sent to the location of the quality assurance team in step 110. Depending on the quality assurance team locality, this can take three to five days, or longer if there are shipping difficulties, just to get the components to the location of the quality assurance team. The quality assurance team then performs a second set of tests or retesting of the components in step 112. This initial testing can take up to one to two weeks. The results of the supplier test are compared with the results of the quality assurance team's tests and often these results do not match because of differences in the testing procedures. In step 114, a determination is made by the quality assurance team as to whether the components have passed their tests. If a quality assurance team determines that the components have not passed the tests, then communication is required between the production and quality assurance teams and the supplier to determine what the anomalies are, in step 116. A decision is then made as to whether a redesign is indicated in step 118. If a redesign is necessary, then the product design and implementation is fixed in step 108 at the supplier site. Testing will then recommence on the fixed or modified component in step 104 and the cycle of test continues. If it is determined that no redesign is necessary, then the quality assurance team may determine they wish to waive certain requirements that were originally mandatory in the test plan, in step 120. Once the components have passed the tests of the quality assurance team or requirements have been waived, then the component qualification is finished in step 122 and the component is then ready for mass manufacture. This entire test cycle can take a significant amount of time out of the time-to-market for a component. Thus, it is important to reduce the amount of fixes that are necessary and reduce the amount of time necessary to test in order to bring quality components and devices to the market in a more timely manner.

Figure 2:
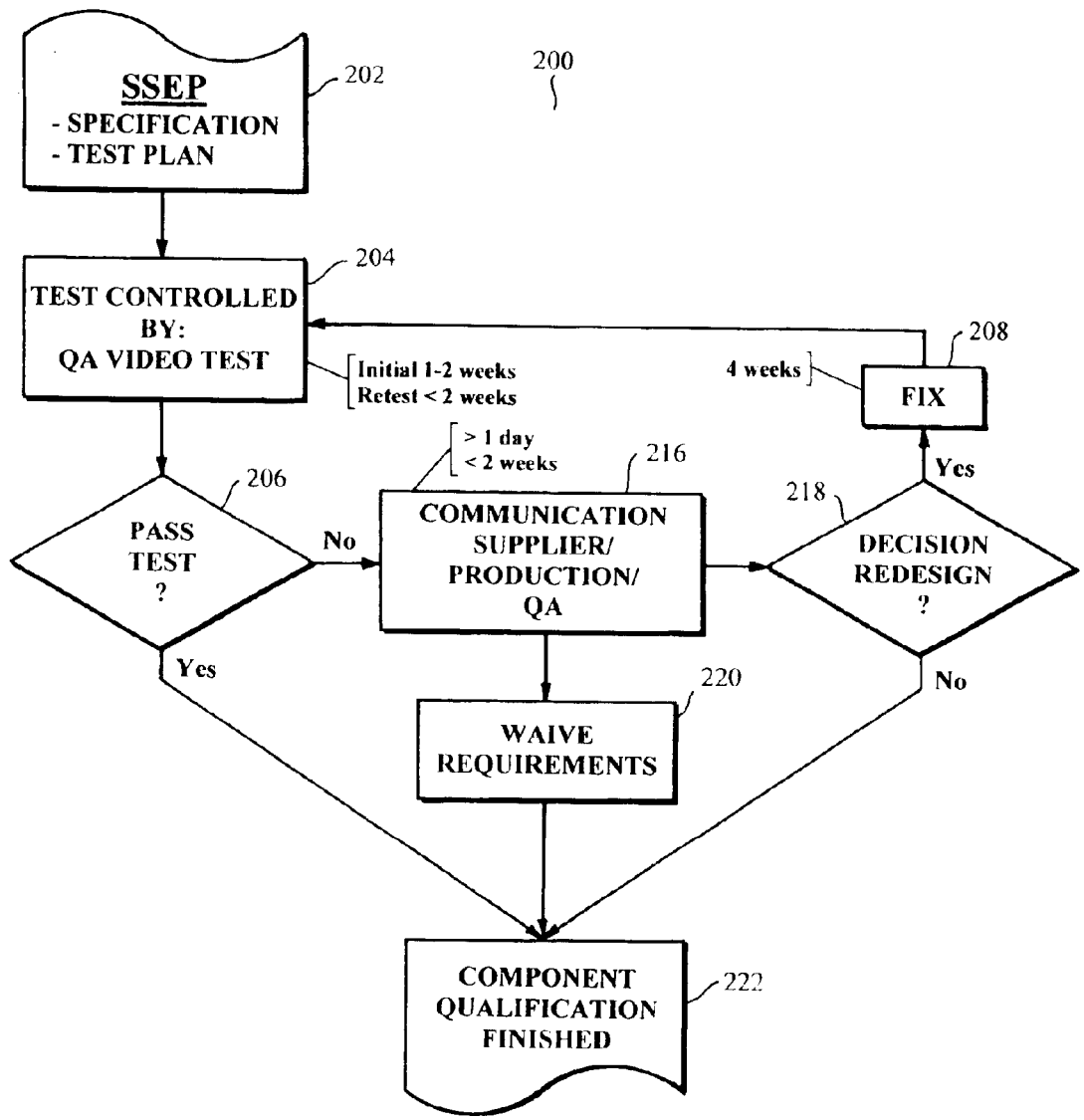
FIG. 2 shows a method for testing electronic components according to one embodiment of the present invention.

Referring now to FIG. 2 there is shown a method 200 of testing electronic components which reduces the time to market for a given electronic component. In step 202, an SSEP (Supplier Self Evaluation Process) is developed according to the production team's specifications and a test plan is generated. The initial tests of the electronic component are performed by the supplier team in step 204 and controlled by the quality assurance team in a video test. Thus, the quality assurance team can remotely monitor and control these initial tests and correct any anomalies in the testing procedures while the tests are being performed. No additional tests at the quality assurance team site are required. A determination is made as to whether the component has passed the test in step 206. If the component has failed the test, a communication occurs between the production and quality assurance teams and the supplier in step 216 to determine a future course of action. These communications can take between one day to two weeks. It may be determined that certain requirements will be waived in step 220. If so, then the requirements are waived and the component qualification test is finished in step 222. If a decision of redesign is required, then the supplier must fix the errors in the component in step 208. Because the actual hardware has never left the supplier test site, no additional delay of shipping is incurred. Fixing of the component by design or implementation may take approximately four weeks. Once the component has been fixed, another test is required in step 204. Referring again to FIG. 1, steps 110, 112 and 114, as shown within a dotted-line box, are eliminated in the present method 200.

Figure 3:
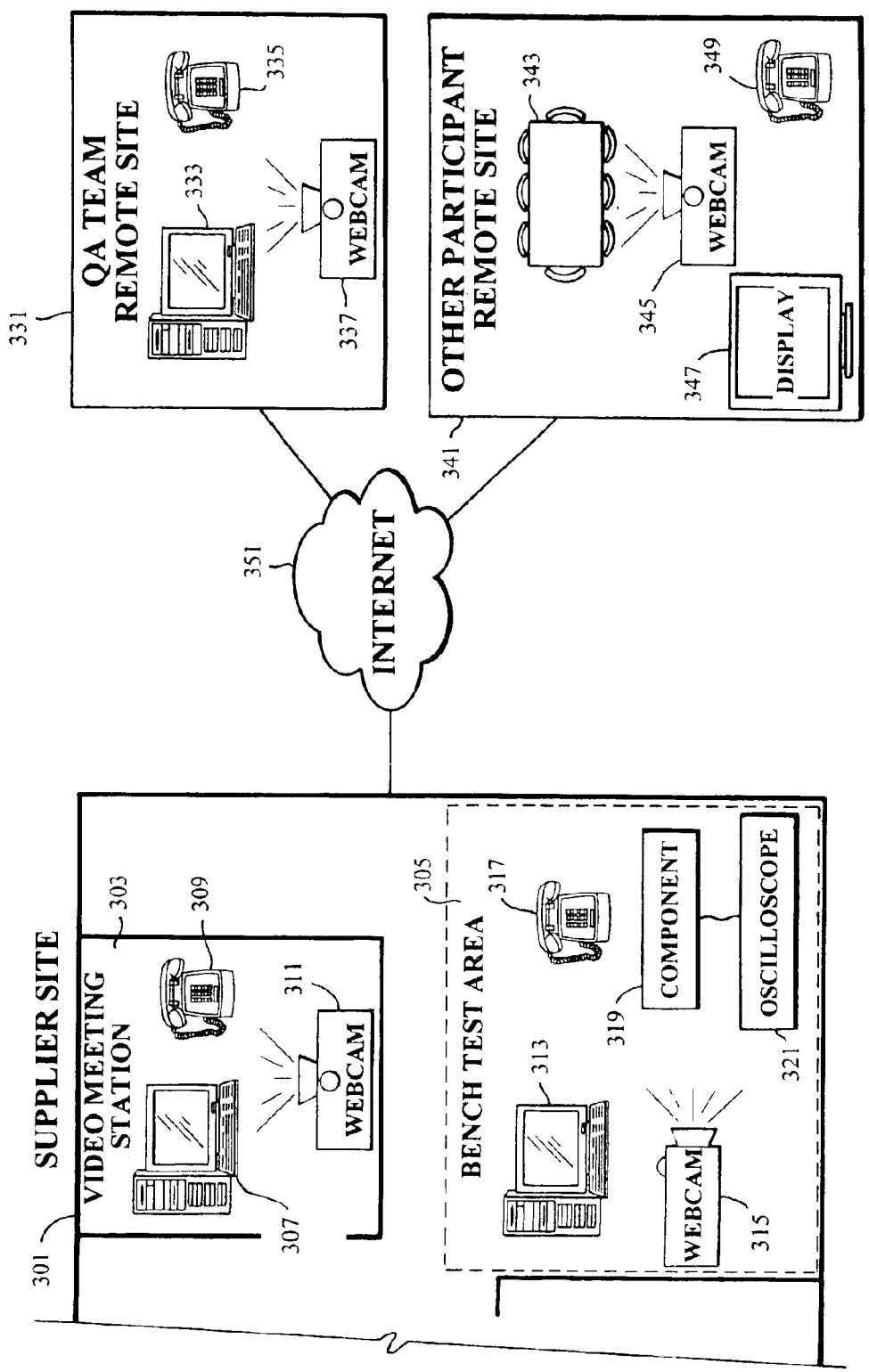
FIG. 3 is a block diagram of one embodiment of a test bench location and remote test control station.

Referring now to FIG. 3, there is shown a block diagram of a bench test system 300 for performing the supplier testing with the quality assurance team controlling video test. In an exemplary embodiment, a supplier site 301 comprises a bench test area 305 and, optionally, a video meeting station 303. In some embodiments, the test area 305 and the station 303 use the same hardware and site. The bench test area 305 is used for testing component 319 with appropriate test equipment, for instance, oscilloscope 321, and is connected to a computing device 313, which in some embodiments is a personal computer running UNIX. The computing device 313 typically runs software (not shown) which controls the testing equipment, i.e., oscilloscope 321. In other embodiments, the personal computer may be running other operating systems, for instance, LINUX, HP/UX or Microsoft® Windows™.

The testing component 319 is typically any component which is tested using a piece of equipment with software controlled test parameters. In the example of a power supply being the test component, an oscilloscope is appropriate test equipment. It will be apparent to one of ordinary skill in the art how to use the present system and method for diverse testing components and corresponding test equipment.

A camera, for instance a Webcam 315, captures the testing of the component 319 and is connected to the computing device 313 for transmitting video information to other sites. In a preferred embodiment, voice communication is performed using a standard telephone 317. In alternative embodiments, software that is used to transmit video data will also be used for voice data. At present time, there are bandwidth limitations that make it more efficient to use a telephone for real time voice communications. The quality assurance team, or other monitoring organization, controls the supplier test from a remote site 331. The remote site also has a computing device 333 for viewing and displaying both video information as captured by the camera 315, and for displaying the results of the actual test, for instance, an output from the oscilloscope 321. The remote site 331 also comprises a standard telephonic device 335 and, optionally, a video camera 337.

The remote site 331 and the bench test area 305 communicate typically via a global distributed computer network, such as the Internet 351. It will be apparent to one skilled in the art that communication can be via an extranet, intranet, or other network of computers. There are several packages available, such as NetMeeting, available from Microsoft® Corporation, which allow one computer to view and possibly control the activities on another computer. A preferred method of testing will include secure sites because some of the design and test data may be confidential. Thus, one or more firewalls may be in place between these computing devices 333 and 313. Products such as NetMeeting will not perform the desired result via a firewall. Other products and services, for instance, the WebEx Services, as available from WebEx Communications, Inc., are able to pass data through a number of firewalls. By using the WebEx Service, the quality assurance team is able to view in near real time on their display monitors on the computing device 333, those programs, which are currently running in the bench test environment, on the computing device 313. For instance, the suppliers will be viewing the output of the oscilloscope 321 on the computing device 313. Concurrently, the quality assurance team can view the same outputs, as they are occurring. Thus, the test can be viewed in real time or near real time at the remote site 331.

Because the actual test procedures at a supplier site may vary from the preferred test procedures, as developed by the production or quality assurance teams, it is advantageous for the quality assurance team to actually be able to view the test as it is being performed rather than just view the test output. Therefore, the video camera 315 captures the component test, and the quality assurance team is able to see where the probes are actually being connected to the component 319, or other aspects of the test. In this manner, the quality assurance team, which is telephonically connected with voice communication to the bench testers, may then direct the supplier to modify where the probes are being placed using this voice system. In alternative embodiments, the voice communication will also be communicated via the network or Internet 351 and come directly from the computing devices 333 and 313.

In an alternative embodiment, the bench test is performed with components 319 and a testing device, for instance, the oscilloscope 321, the output of which is forwarded directly to a video meeting station 303. The video meeting station 303 is typically located physically close to the bench test area 305 at the supplier site 301. Thus, control of the video meeting between the testing facility and the quality assurance team remote site 331, would be controlled at the video meeting station 303. The bench test area 305 controls the component test and has the video camera 315 to capture the video elements of the test and pass the video elements to the video meeting station 303 for further communication with the quality assurance team. The video meeting station 303 may be a part of the test bench area 305, with the interactive communication service running on the test bench computing device 319.

In another alternative embodiment, the test may be viewed by third parties at another remote site 341. These participants typically will be viewing the test only, and not controlling the test. However, it may be desirable for senior members of the executive team, either at the supplier corporation or the production team corporation, to view the test. At the site 341, there is typically a video capture of either the members of a team at the remote site 343, by using a video camera 345, or simply a monitor 347, which shows the video aspects and the test device output components of the test to those team members. These participants will see the test in real time or near real time depending on the bandwidth available. This remote site 341 may also be running the WebEx services or similar interactive communication tool.

The current implementation of the WebEx interactive services allows a host to create a "meeting" between and among two or more remote sites. The host has all rights to control the meetings, but may allocate another meeting member rights to perform certain functions. For instance, in an embodiment including a supplier test site 301, a quality assurance remote test site 331 and a third remote site 341, the supplier hosts the WebEx meeting. When a member of the quality assurance team needs control of the test for training or corrective reasons, the supplier "invites" the quality assurance meeting member to "take control" of the meeting. In some embodiments, one or more other remote sites 341 will have a computing device (not shown) which is capable of controlling the test at the supplier site 301. The host (supplier site) can then authorize any member of the meeting to take control.

The quality assurance team at the remote site 331 is capable of both monitoring and controlling the test being performed at the supplier's site by virtue of the software controlling capabilities of the test components, for instance, the oscilloscope 321. A variety of user selectable parameters are available to the test team. Typically, in testing systems of the prior art, the supplier will select their parameters based on the test plan developed earlier in the production/manufacturing cycle. In some cases, these parameters are either entered incorrectly or have been defined incorrectly, or need to be modified on the fly in order to properly test the electronic component. In systems of the prior art, the actual test parameters used by the supplier test team would not be fully known to the quality assurance team until the hardware and test results have been shipped from the supplier to the quality assurance team, thus, producing a delay of several weeks from the time of the test.

An advantage of the present method is that the quality assurance team can view these test parameters in real time as the test is being performed. The WebEx interactive service allows the quality assurance team to control the operation of the software on the bench test computing device 313. The bench test computing device 313 is connected to the oscilloscope 321 in order to control these parameters. If the quality assurance team ascertains that the parameters are erroneous, they may correct the parameters or modify the parameters, as necessary. Thus, the nature of the test can be modified immediately, rather than waiting two to three weeks for the results to be reviewed at the quality assurance team's site 331. This method also has the advantage of being able to properly train the test team at the supplier's site. For instance, there may be a great deal of personnel turnover and a test team performing one test may not still be available three or four months later when the next version of the component 319 is to be tested. Thus, there is a great deal of testing expertise and knowledge lost due to these personnel turnovers. Because the quality assurance team is typically more stable, they can effectively train new supplier test personnel as each test is being performed by virtue of controlling the parameters and the procedure.

There are currently bandwidth issues which cause some delay in the video component of the test. Because the telephonic connection between the two sites is in real time, two people on either end can synchronize the timing of the test by requesting certain movements on the telephone and then waiting to see how much time passes before they see that movement on the video screen. For instance, if the quality assurance team believes that there is a delay of several minutes in the video aspect of the test, they may request the supplier's side test team to perform a movement such as "lift your pencil in the air." Once that request is made telephonically, the quality assurance team waits to see how much time passes before they can view that pencil being raised on the video monitor. In this way, the video information can be synchronized to the test output information. Another method if synchronization is to have a clock visible in the video display which is synchronized manually at the commencement of the test. An electronic clock can also be synchronized for viewing with the actual test equipment test results. The test equipment output information is more typically simultaneous because there are fewer buffering delays with the output than there are with the video. It is foreseen that in the future, these bandwidth issues will be alleviated by faster hardware or simply an increase in bandwidth or buffering capabilities. In that case, in alternative embodiments, the telephonic and voice communication may be desired to also be passed through the Internet using WebEx services rather than using a separate telephone connection.

In an alternative embodiment, the quality assurance team remote site 331 will also have the video camera 337 so that visual signals can be sent back to the bench test area. In this embodiment, the quality assurance team remote site 331 will have a duplicate or similar bench test environment so that the quality assurance team can visually show the bench test personnel how to set up or execute the test. For example, the quality assurance team remote site 331 may have a component to be tested and test equipment, such as, an oscilloscope. The video camera 337 will face the test component and test equipment so that when a member of the quality assurance team applies the oscilloscope probes to the test components, the supplier site personnel can see visually on their computer display where to apply the probes. The supplier site personnel will then apply their probes from the oscilloscope 321 to their test component 319 in the same fashion as the quality assurance team. This method has the advantage of acting as a training device for the supplier site test personnel. In this alternative embodiment, the personnel at the supplier site 301 will see the visual information from the quality assurance team. However, during a typical test, the test data will be going from the supplier site 301 to the quality assurance team remote site 331.

In another alternative embodiment, the two tests will occur simultaneously, with virtually identical bench test areas at both sites 301 and 331. In this case there will be a computer display at both sites 301 and 331 to display both the visual and test results of the other site. In this way, two sites can ensure that the testing is being performed as desired. Current limitations of the WebEx interactive service allow one meeting at a time, i.e., only one site may share application data at a time in one meeting. Therefore, if the supplier team and the quality assurance team wish to conduct simultaneous tests and/or training, two computing devices running the interactive service are required. Only one host can share applications and data at the same time. Thus, each site will be a host of one meeting and will have a control and display system for each meeting to be held simultaneously. If concurrent meetings are not required, the host can be switched back and forth, as necessary, to share the appropriate application data, and to switch ownership of presentment/invitation rights. It will be apparent to one skilled in the art that this is an implementation limitation and not a limitation of the present system and method.

Figure 4:
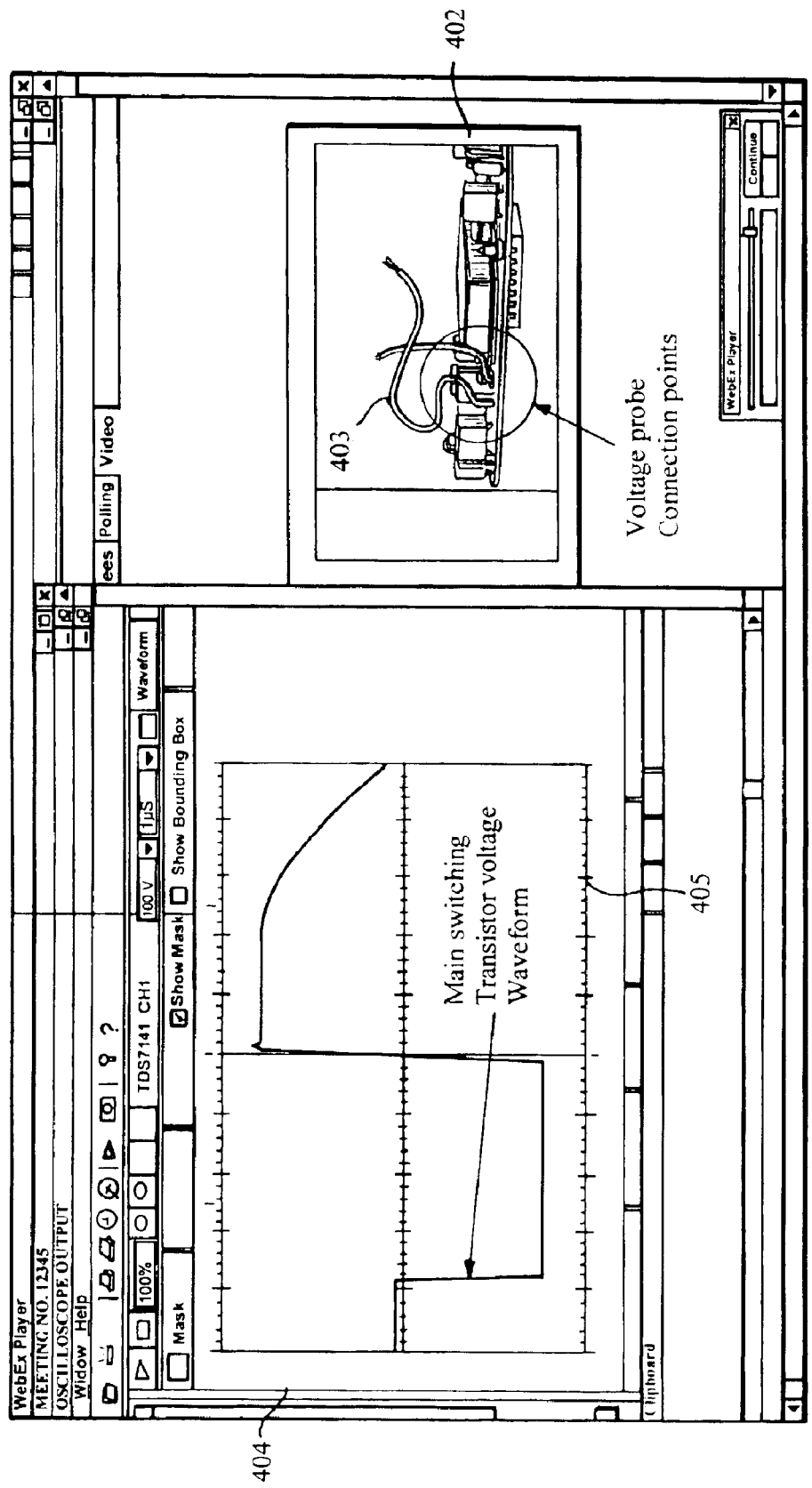
FIG. 4 shows a screen shot of a visual display in one embodiment of the invention, during application sharing and video mode.

Referring now to FIG. 4, there is shown an exemplary screen display with two windows visible. The first window 402 shows a snapshot of the visual component of the test. The component being tested in this example is a power supply shown with voltage probe connection points highlighted in 403. The left window 404 shows the output from testing equipment, in this case an oscilloscope, with the main switching transistor voltage waveform 405 specifically being shown. As the supplier side personnel conduct the test, in this case, on the power supply, the video image on the right 402 will be updated and the data image in the left window 404 will be updated as the information changes. Based on bandwidth issues, the two images on the left and right may not be fully synchronized at all times. There may be a short delay in the updating of the video image because it takes a lot more data to buffer than the output of the oscilloscope as shown on the left. In this case, if the testers are moving the probes or changing the test parameters, the waveform on the left 405 may change, but the connection points 403 may not appear immediately to have changed. In this case, the tester can communicate directly with the controllers at the quality assurance team remote site by voice communication using the telephone lines, as discussed above.

Once bandwidth is increased based on improvements in technology, there will fewer delays buffering video images and the windows on the left and the right will become more synchronized. It is also foreseen that when bandwidth increases, that voice communication will be conducted using the same WebEx service rather than the hardwired telephone lines.

For testing of other types of devices, the left window 404 will show appropriate output data for the device being tested. There may be multiple windows based on multiple simultaneous tests of different aspects of that component. Any number of windows may be on the display at any time, with one being the active window and other windows being inactive. A control window (not shown) will also be on the display either active or inactive. The control window allows the quality assurance team to change the test parameters of the test equipment, for instance, an oscilloscope, that is controlled by software on the computer.

In an exemplary embodiment, a test component, also referred to as a unit under test (UUT), is on a test bench at a supplier site in a geographic location remote from the quality assurance team remote site, for instance, Taiwan. The quality assurance team remote control station is in a production team location in, for instance, France. The exemplary test bench equipment includes: an AC source, for instance, commercially available HP AC source 6813A; an electronic load device, for instance, commercially available Prodigit 3300A; an oscilloscope, for instance, commercially available Tektronix 510A; a power meter, for instance, commercially available Voltech PM1200; a hybrid temperature recorder, for instance, commercially available HP 34970A; and a power analyzer, for instance, commercially available Voltech PM1200. It will be apparent to one of ordinary skill in the art that a variety of devices could be substituted for the specific items listed above, and that depending on what type of component is under test, different types of testing equipment would be used. The equipment used to test the UUT is typically controlled via software running on the test bench computer. The supplier site also utilizes a Webcam, a UUT, oscilloscope, and diverse test and measurement equipment. The quality assurance team remote site utilizes a personal computer (PC) and Webcam.

Figure 5:
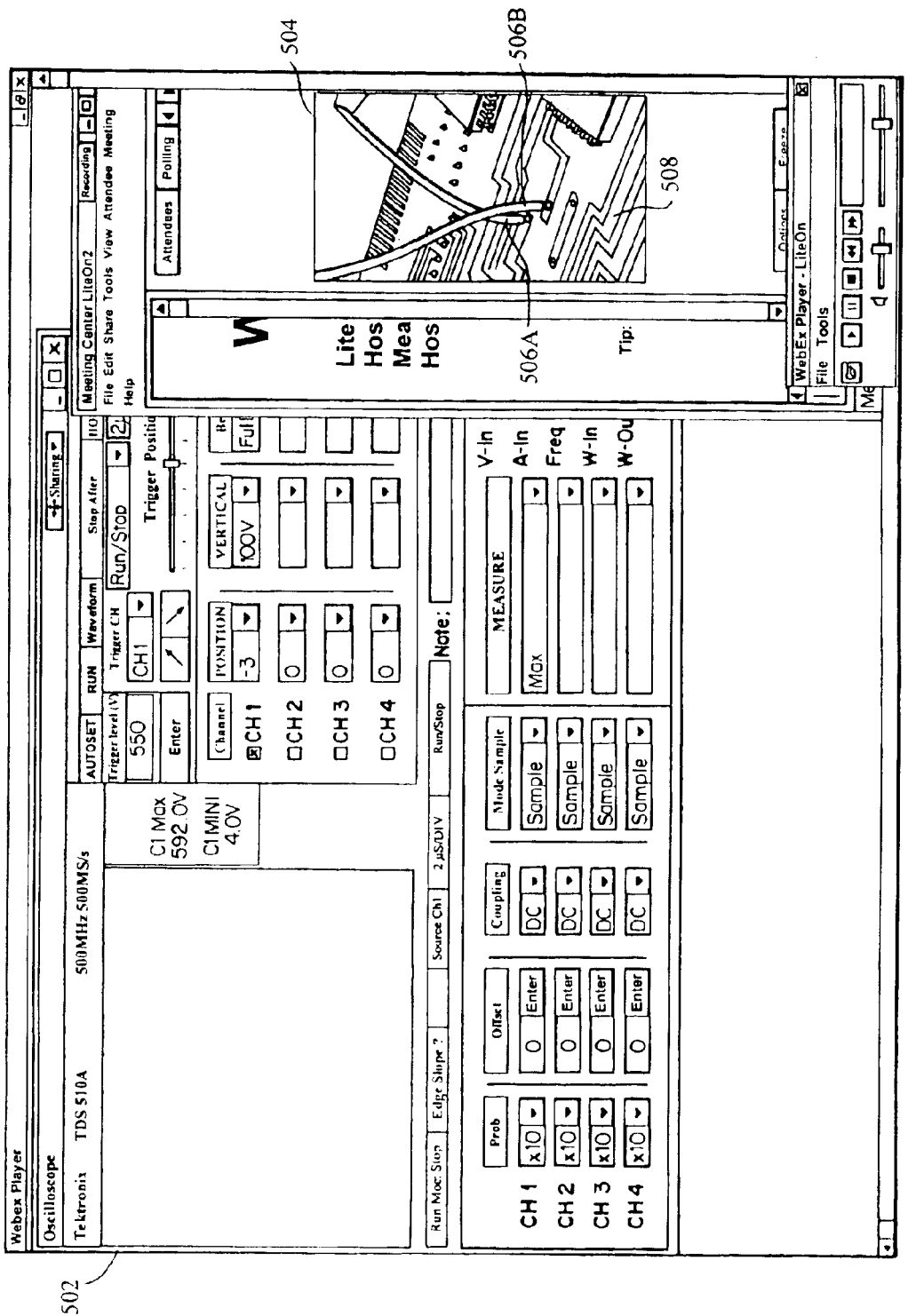
FIG. 5 shows a screen display of an embodiment of the present invention during application sharing and video mode.

Referring now to FIG. 5, there is shown a screen display of an embodiment of the present invention during application sharing and video mode. For example, a supplier testing a power supply has control as they are presenting the test to the quality assurance team. The supplier software controlling a Tektronix oscilloscope is shown in the left window 502. A Webcam image 504 of the power supply being tested is partially shown in the right window. Voltage probes are attached to the power supply 508 at points 506A and 506B.

Figure 6:
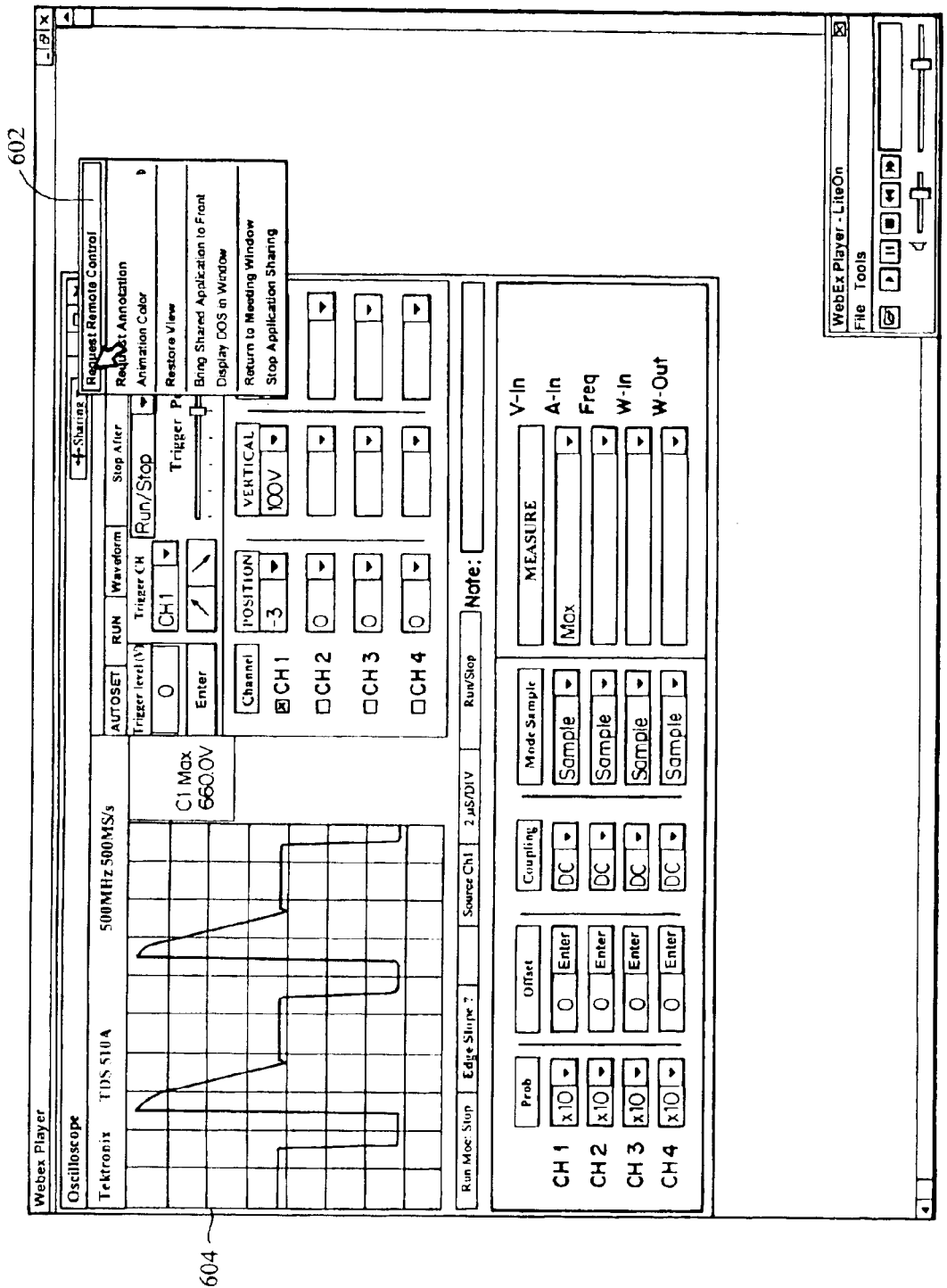
FIG. 6 a request remote control command screen according to one embodiment of the invention.

Referring now to FIG. 6, there is shown a request remote control command screen. In the example, the quality assurance team desires to change some of the test settings due to an examination of the oscilloscope output, as shown in window 604. The controller selects an option from pull-down window 602 to request remote control. The controller receives an invitation to take the remote control for the software used in the application-sharing mode. A simple click of the mouse on one of the pull-down boxes is now all that is necessary for the controller to take control of the supplier's hardware test parameters, even though the sites are over 6000 miles apart.

Figure 7:
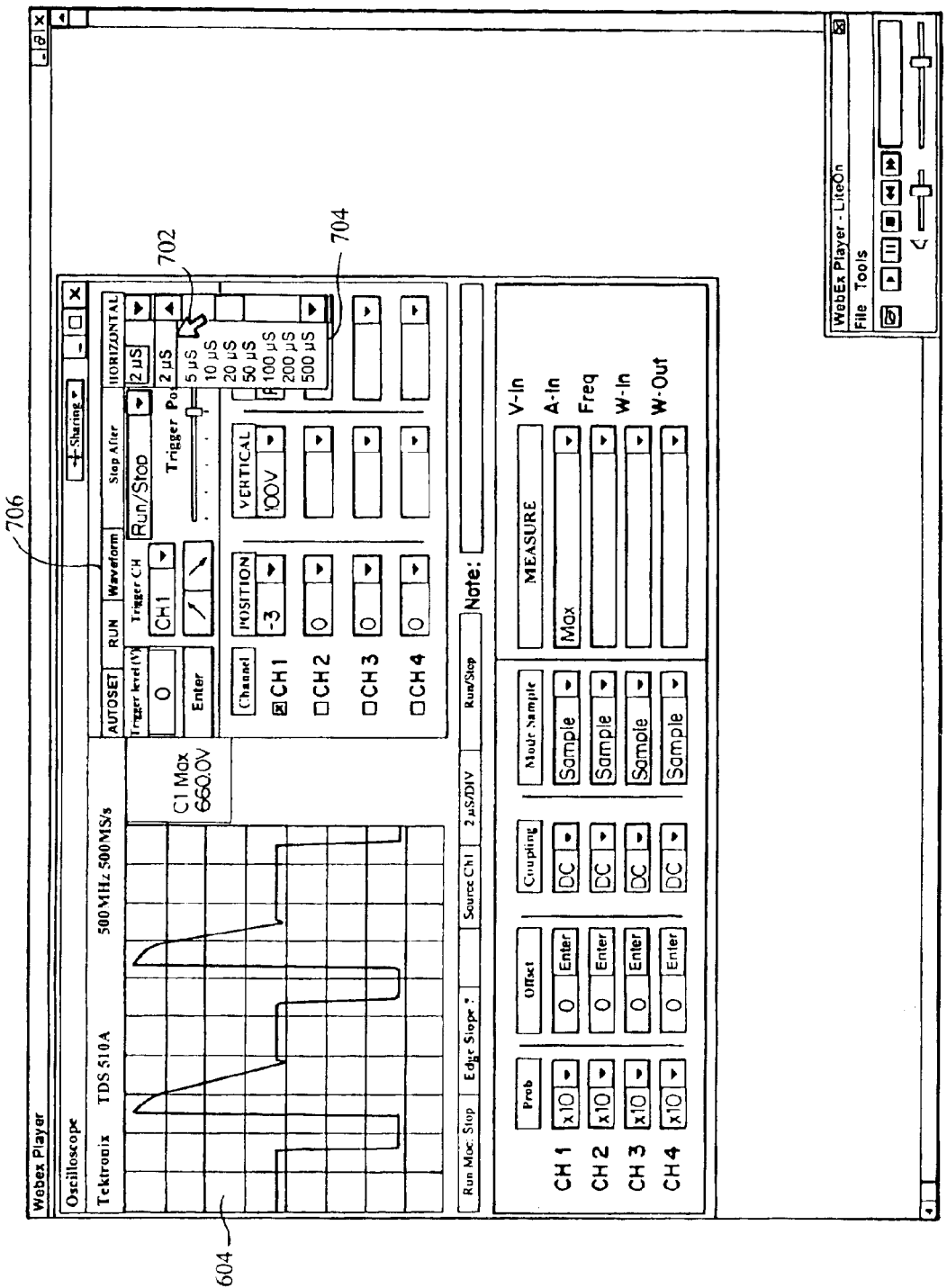
FIG. 7 shows a pull-down list for making parameter changes to a test by remote control using a specific test device running a specific software version, according to one embodiment of the invention.
Figure 8:
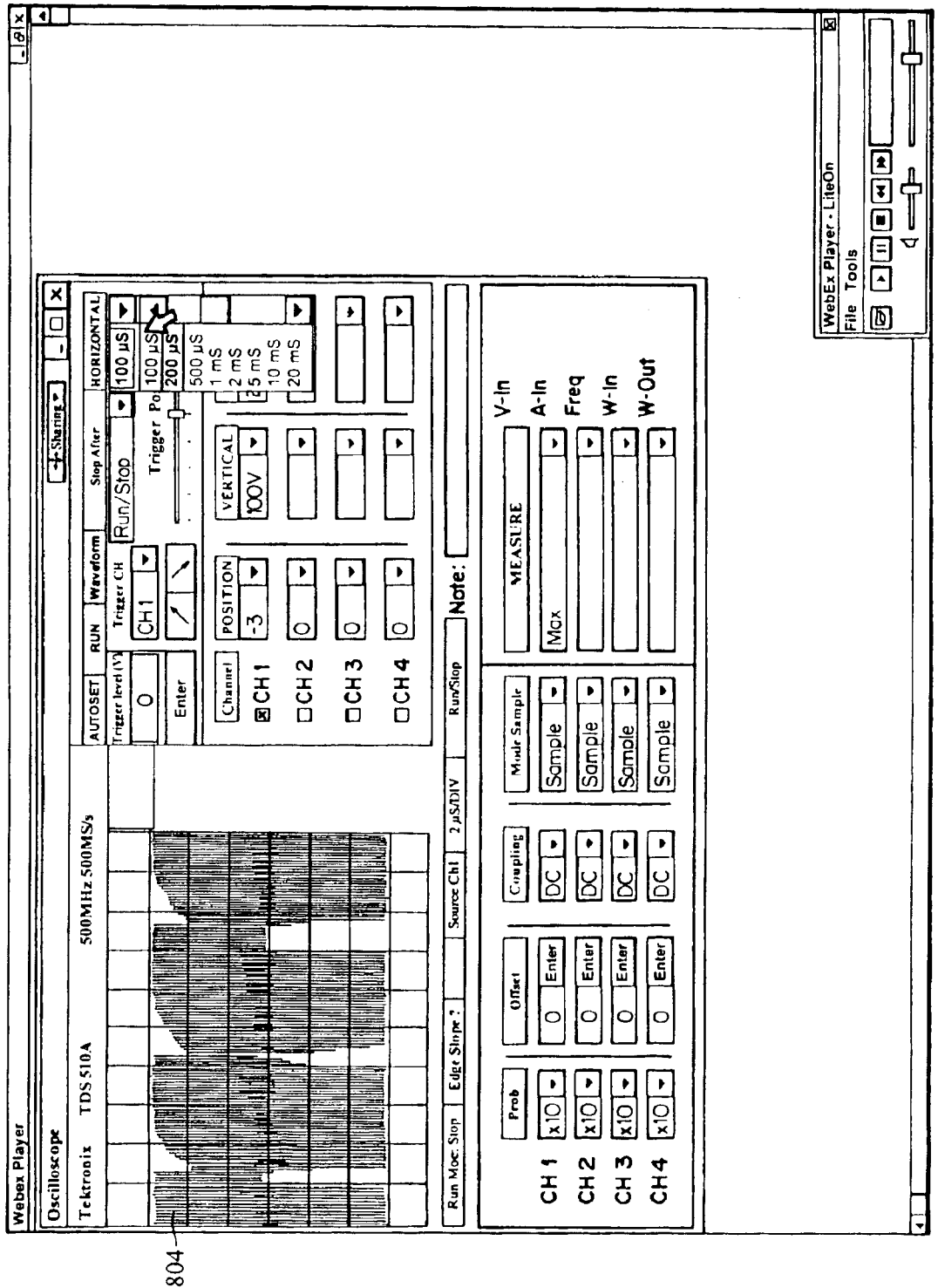
FIG. 8 shows an updated test device output, specifically a waveform from an oscilloscope, according to one embodiment of the invention.

Referring now to FIG. 7, there is shown a pull-down list for making parameter changes to the test by remote control. The controller at the quality assurance team remote site selects the pull-down list with cursor 702. Options for changing time based settings 704 appear to selection. Once the controller changes the time based setting, or other parameter, the test at the supplier site is immediately affected. Any number of test parameters may be control by the quality assurance team in this manner. It will be apparent to one skilled in the art that different parameters will be available for different testing equipment and different software driver versions. Further, it will be apparent to one of ordinary skill in the art that the data may appear in a window, or display area, at any location on the display, and that left and right designations are used merely for illustrative purposes. After selecting the waveform button 706, an updated waveform can be viewed in area 604, as shown in FIG. 8 (804).

In an alternative embodiment, the present system and method is used for remote testing of items other than electrical components. For instance, a vintner may have several locations for bottling wine. It may be desirous to test a variety of characteristics of the wine during the fermentation process, for example, PH, or sugar content, carbonation level, alcohol level, etc. Appropriate test equipment is used to probe the wine or barrel, where the test equipment has software selected parameters. Referring again to FIG. 3, the test or measurement equipment 321 will be, for instance, a probe for measuring sugar content and its test parameters will be controlled by computing device 313. The senior wine maker will be at remote site 331 and control tests and measurement at the local vineyard 301 from the remote site 331. The senior wine maker can view the vineyard's testing via the video component of the present system to ensure that the fermentation process is proceeding according to proper procedures.

In another alternative embodiment, the present system and method is used for testing the strength and quality of an item of manufacture. For instance, certain safety standards may be regulated for products such as automobiles or children's toys. In other cases, a trademark owner may wish to ensure the quality of a franchiser's products from a remote location. In these cases, the article of manufacture can be tested and measured using a variety of computer controlled equipment. The franchise licensor, or government regulatory agency can monitor and control these tests remotely, as described above. The method and system described herein provide the advantage that the test monitoring organization saves time and expense of not having to travel to the supplier sites for each test. Further, additional testing or retesting at the site of the monitoring organization is not necessary.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for remote testing of electrical components, comprising:
   a remote test control station;
   a test bench device for testing a unit under test (UUT);
   a video meeting station connected to the test bench device, wherein the video meeting station comprises means for capturing visual information and sending the visual information to the remote test control station, means for audio communication with the remote test control station, and means for receiving video information from the remote test control station;
   a remote viewing site for monitoring a test conducted at one of the first test bench device and the second test bench device; and
   means for controlling test parameters by the remote test control station, wherein the test parameters are used by the test bench device to control diagnostic equipment used to test the electrical component,
   wherein the remote test control station comprises means for audio communication with the video meeting control station, means for receiving video information from the video meeting control station, and means for displaying diagnostic information output from the test bench device in near real-time.

2. The system as recited in claim 1, wherein the video meeting station and the test bench device are integrated as one physical system.

3. The system as recited in claim 1, wherein the means for capturing visual information is a camera selected from a group consisting of an inexpensive, low resolution video camera and a high-resolution video camera.

4. The system as recited in claim 1, wherein the means for audio communication is a communication means selected from a group consisting of a standard telephone connection and a Web-enabled voice link.

5. The system as recited in claim 1, wherein the means for receiving video information is an interactive service displaying video information on a display window.

6. The system as recited in claim 1, wherein the means for controlling test parameters further comprises:
   an interactive service running on both the test bench device and the remote test control station;
   software for controlling diagnostic/test equipment running on the test bench device; and
   means for taking control of the software for controlling diagnostic/test equipment via the interactive service.

7. The system as recited in claim 6, wherein the interactive service operates over one or more firewalls.

8. The system as recited in claim 1, wherein the remote test control station further comprises means for capturing visual information and sending the visual information to the video meeting station.

9. The system as recited in claim 8, wherein the remote test control station further comprises a second test bench device for testing a second UUT concurrently with the UUT being tested by the first test bench device.

10. The system as recited in claim 9, wherein a test conducted at the second test bench device at the remote test control station is monitored at the video meeting station for training purposes.

11. The system as recite in claim 10, wherein the second test bench device further comprises a second means for controlling test parameters, wherein the first means for controlling test parameters further comprises a first interactive service running on both the test bench device and the remote test control station, and wherein the second means for controlling test parameters further comprises a second interactive service running on both the second test bench device and a computing device at the video meeting station.

12. The system as recited in claim 11, wherein both the first test bench device and the video meeting station are part of an integrated physical system.

13. The system as recited in claim 10, wherein both the first test bench device and the video meeting station are part of an integrated physical system.

14. The system as recited in claim 1, wherein the remote viewing site comprises means for receiving video and audio information from a test bench device.

15. A method for remote testing of electrical components, said method comprising steps of:
   (a) testing a unit under test (UUT), by a testing team, using a test procedure developed to correspond to a specification, wherein a monitoring team remotely controls test parameters of the test and monitors the testing remotely via a video and audio link to the testing team;
   (b) determining by the monitoring team whether the UUT passed the testing;
   (c) communicating between the testing team and the monitoring team, if the UUT failed the testing, to determine whether the UUT is acceptable;
   (d) fixing, if necessary, at least one feature of the UUT; and
   (e) repeating steps (a) through (d) for the fixed UUT, until the UUT passes the testing.

16. The method as recited in claim 15, wherein determining whether the UUT is acceptable includes a determination of whether test requirements are waivable or whether the UUT needs to be redesigned.

17. The method as recited in claim 15, wherein the monitoring team remotely controls test parameters using an interactive service which allows the testing team to authorize the monitoring team to control parameters of software controlling test equipment, the test equipment being used to conduct the test, and wherein the monitoring team remotely controls the test parameters in near real time during the test.

18. The method as recited in claim 17, further comprising a step of training the testing team by the monitoring team during the testing.

19. The method as recited in claim 17, wherein the monitoring team views output of the test equipment and video of the test conducted at the testing team site on one display monitor in a plurality of display areas, in near real time.

20. A method for remote testing of an item of manufacture, said method comprising steps of:
   (a) testing an item under test (IUT), by a testing team, using a test procedure developed to correspond to a specification;
   (b) remotely monitoring, by a monitoring team, the testing via a video and audio link to the testing team, wherein the monitoring occurs in near real time, and wherein the monitoring team views output of the test equipment and a video of the test equipment on one display monitor; and
   (c) remotely controlling parameters of the test equipment, by the monitoring team, at the invitation of the testing team.

21. The method as recited in claim 20, further comprising steps of:
   (d) determining by the monitoring team whether the IUT passed the testing;
   (e) communicating between the testing team and the monitoring team, if the IUT failed the testing, to determine whether the IUT is acceptable;
   (f) fixing, if necessary, at least one feature of the IUT; and
   (g) repeating steps (a) through (f) for the fixed IUT until the IUT passes the testing.

22. The method as recited in claim 21, wherein determining whether the IUT is acceptable includes a determination of whether test requirements are waivable or whether the IUT needs to be redesigned.

23. The method as recited in claim 20, further comprising steps of:
   monitoring of the testing by at least one additional team, at the invitation of the testing team.

24. The method as recited in claim 21, further comprising steps of:
   remotely controlling parameters of the test equipment, by one of the at least one additional teams, at the invitation of the testing team.

* * * * *